Aug. 29, 1939.   R. H. ARCHBALD   2,171,298
RATE OF CLIMB INDICATOR
Filed March 22, 1938

Inventor
Ralph H. Archbald
By Grafton, Cole, Morse
& Grindle,
Attorneys.

Patented Aug. 29, 1939

2,171,298

UNITED STATES PATENT OFFICE 2,171,298

RATE OF CLIMB INDICATOR

Ralph Harrison Archbald, Burgh Heath, England

Application March 22, 1938, Serial No. 197,508
In Great Britain October 28, 1937

7 Claims. (Cl. 264—1)

This invention relates to rate of climb indicating instruments of the kind comprising a flexible diaphragm subjected on one side to atmospheric pressure and on the other side to the pressure of the gas within a capacity vessel which is hermetically sealed except for a very small leak to the atmosphere, and mechanism for indicating the movement of the diaphragm.

When an aeroplane carrying such an instrument is flying horizontally the pressure within the capacity vessel will be that of the atmosphere owing to the presence of the leak, and the diaphragm will be subjected to equal pressures on its opposite sides. The instrument will then indicate zero rate of climb. If the aeroplane climbs the atmospheric pressure, and, therefore, the pressure on one side of the diaphragm, falls. The pressure within the capacity vessel will also fall owing to leakage of gas to the atmosphere but the pressure within the vessel will be higher than the atmospheric pressure. The difference in pressure will be sufficient to cause the gas to leak at a rate such that the pressure within the vessel changes at the same rate as the atmospheric pressure is changing. The pressure difference will thus be proportional to the rate of change in the atmospheric pressure and, therefore, to the rate of climb of the aeroplane. The pressure on the two sides of the diaphragm will thus become unequal and the diaphragm will move and adjust the indicating mechanism to indicate the rate of climb of the aeroplane. When the aeroplane descends, similar conditions arise except that the pressure within the vessel is below the atmospheric pressure.

Hitherto, the more usual practice has been to employ for the capacity vessel a thermally insulated vessel separate from the instrument proper and connected thereto by tubing. It has, however, also been proposed to employ the capacity of the instrument case itself as the capacity vessel, the instrument being entirely self-contained, with no external reservoir assembly. The present invention is concerned with an instrument of the latter type employing a self-contained capacity.

This invention provides a rate-of-climb indicating instrument of the type described above comprising in combination an instrument casing hermetically sealable to provide a self-contained air capacity, a fluid-pressure chamber located within the instrument casing and constituted by a dished back plate and a flexible diaphragm secured to said plate and extending over its concavity, the chamber being formed with a plurality of bleed holes each of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, and indicating means so operatively connected to the diaphragm as to move proportionately to pressure-responsive movements of the diaphragm.

Preferably each bleed hole is formed in a jewel made of hard material (such as agate, glass or watch jewel) or metal having a low coefficient of expansion.

The invention also includes the provision of a zero damping device arranged for operation, in the region of the zero mark, by magnetic attraction between the pointer or equivalent moving part of the indicating mechanism and the dial or equivalent stationary part, to damp out small oscillations of the pointer or equivalent part on either side of the zero reading.

An example of the invention will now be described with reference to the accompanying drawing, in which.

Like reference numerals indicate like parts throughout the figures.

Figure 1:
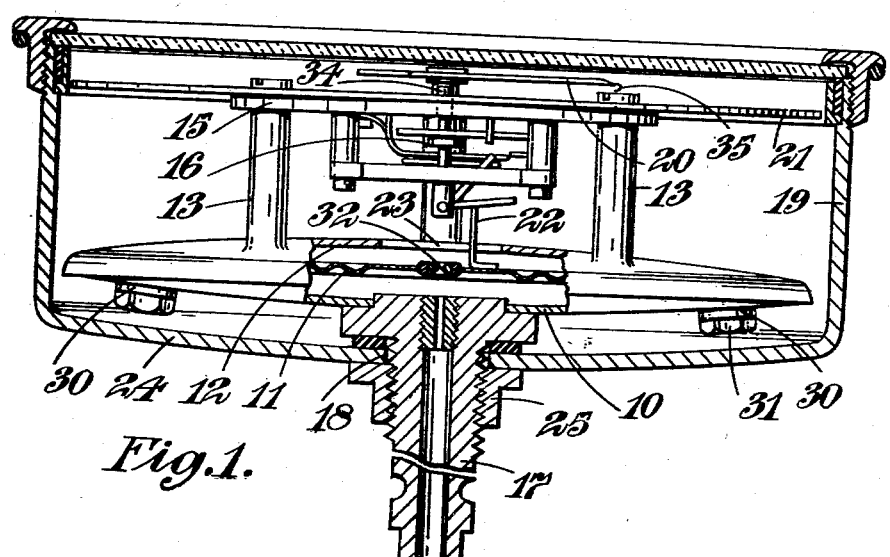
Figure 1 is a side view, partly in section, of the fluid pressure chamber with the associated indicating mechanism, the instrument case being shown in section lines.

In this example the various features of the invention are embodied in an indicating instrument of known type comprising a fluid pressure chamber and an associated indicating mechanism located within a hermetically sealed casing, the fluid pressure chamber being constituted by a dished back plate 10 having a flexible diaphragm 11 marginally secured to it and extending across its concavity, and a dished front plate 12 marginally secured to the back plate with the concavities of the two plates opposed to one another, the whole forming a capsule across the interior of which the diaphragm extends. The dished front plate 12 has attached to it by pillars 13 a mounting 15 which carries the instrument movement 16, and a screw-threaded nipple 17 is attached to the back plate 10 around a central aperture 18 therein and extends outwardly at right-angles to the back plate, the whole forming a single unit for assembly as such in the hermetically sealable instrument case 19 of usual type and for attachment thereto solely by the nipple 17. The instrument movement 16 is of known type comprising multiplying mechanism which drives an indicating pointer 20 movable over a scale on a dial 21 and which derives its movement from a push rod 22 attached to the centre of the diaphragm 11 and extending through a central aperture 23 in the front plate 12. The central aperture 18 is provided in the base 24 of the instrument case so that the screwthreaded nipple 17 may project through the back of the case and be secured in position by a nut 25. The nipple 17 is as usual arranged to take the Pitot connection.

Figure 3:
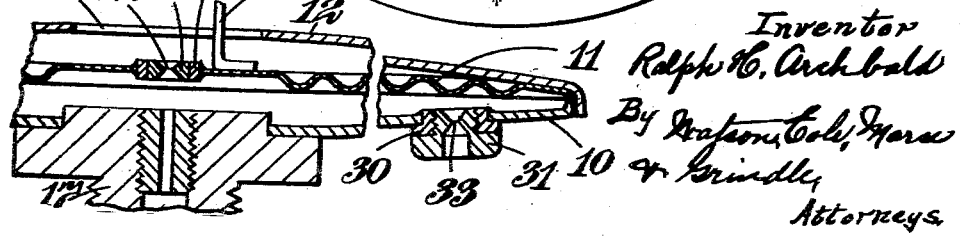
Figure 3 is a cross-section of the fluid pressure chamber (to a larger scale than Figures 1 and 2) showing one arrangement of bleed-holes.

According to the present invention the diaphragm 11 is formed with a central hole and a metal collet or jewel 30 is secured to the diaphragm in alignment with this hole. A piece of agate 31 or other material having a low coefficient of expansion is set in the jewel 30 and the agate is drilled with a hole 32 having a minimum cross-sectional area of a definite size, and having one or both of its entrances dished (as shown in Figure 3) to form a sharp edge surrounding the minimum cross-sectional area of the hole. In one case the minimum diameter of the hole was adjusted at approximately 0.005 inch but the exact diameter is dependent upon the size of the casing and other factors. Owing to the dished entrance or entrances to the hole the actual orifice has no substantial length so that changes in the viscosity of the air passing through the hole due to temperature effects will not greatly alter the rate at which the air passes through the hole under the influence of a given pressure difference on opposite sides of the diaphragm. The diameter of the actual orifice will, further, not change greatly with changes in temperature owing to the low coefficient of expansion of the material in which the hole is formed. Employment of a relatively hard material such as agate has the further advantage that the hole can be drilled accurately to size and with smooth surfaces.

When the fluid pressure chamber has a single bleed-hole 32 formed in the centre of the diaphragm, as described above, it has been found that while the instrument may give a good performance up to say 10,000 feet it will not give sufficiently accurate readings above that altitude. This disability may be removed by the provision, in combination with one or more bleed-holes in the diaphragm, of a plurality of bleed-holes in the back plate 10 across which the diaphragm is stretched. With an arrangement of that kind all the bleed-holes are of minute dimensions, e. g. 0.0025" to 0.0015" according to the substance of the diaphragm. As shown in Figure 3 there may be one bleed-hole 32 in the centre of the diaphragm and several, say four, bleed-holes 33 symmetrically arranged in the back plate 10, each hole being formed in a jewel made of hard material, metal, alloy or bimetallic combination, having a low coefficient of expansion. With an arrangement of this kind it is possible to obtain an instrument which will give sufficiently accurate readings up to about 25,000 feet. In the manufacture of instruments of the kind with which this invention is concerned it is difficult in practice to ensure that all the diaphragms are exactly alike, and a further advantage of this invention is that the effective number of bleed-holes 33 in the dished back plate 10 may readily be varied to compensate for variations in the characteristics of different diaphragms. For example, if in testing an instrument, it is found that the movement of the pointer is too rapid, one of the bleed-holes in the back plate may be eliminated by covering it with solder or similar material.

As shown in Figure 3, the back and front plates 10, 12 are arranged so close to the diaphragm as to provide stops to limit the movement of the diaphragm in each direction and so to prevent overstrain. Preferably the diaphragm is corrugated except for a small portion (say about ¼" in width) at its peripheral edge which is left plane to allow the diaphragm to "breathe" evenly in both directions.

Figure 2:
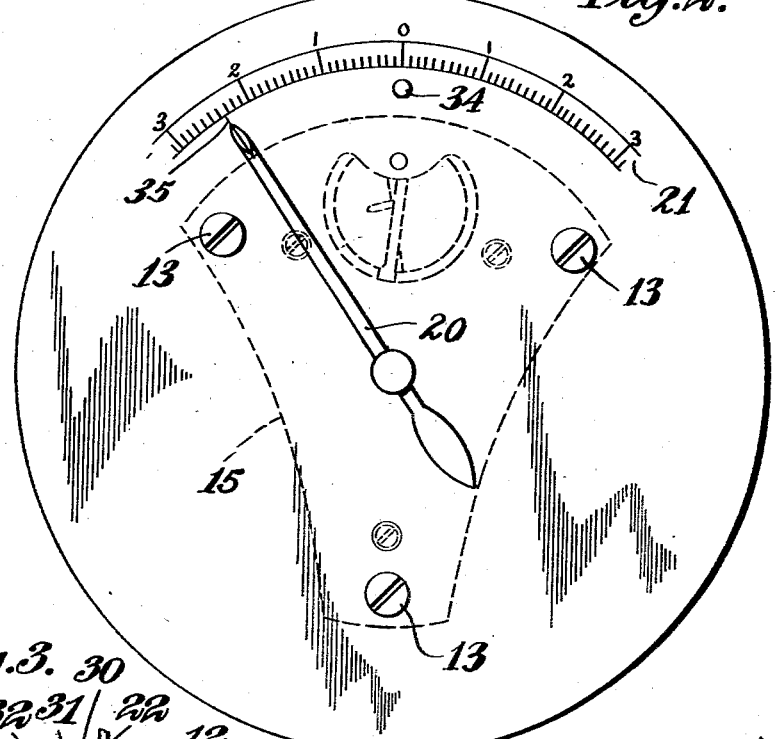
Figure 2 is a plan view showing the zero damping device.

Referring to Figure 2, the zero damping device embodied in the construction according to this example, comprises a small magnetised steel button 34, placed on the zero mark of the dial and co-operating with a pointer such as 20 in the form of a steel needle, or with a needle of non-magnetisable metal or alloy (e. g. aluminium) fitted at its outer end with a steel whisker 35. With this arrangement it will be understood that when the needle 20 comes within the area of magnetisation of the button 34 it will be drawn up to the zero mark, and in this way small oscillations about the zero mark will be effectively damped.

I claim:

1. A rate-of-climb indicating instrument of the type described comprising in combination an instrument casing hermetically sealable to provide a self-contained air capacity, a fluid-pressure chamber located within the instrument casing and constituted by a dished back plate and a flexible diaphragm secured to said plate and extending over its concavity, the chamber being formed with a plurality of bleed holes each of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, and indicating means so operatively connected to the diaphragm as to move proportionately to pressure-responsive movements of the diaphragm.

2. A rate-o-climb indicating instrument of the type described comprising in combination an instrument casing hermetically sealable to provide a self-contained air capacity, a fluid-pressure chamber located within the instrument casing and constituted by a dished back plate and a flexible diaphragm secured to said plate and extending over its concavity, the diaphragm and the back plate being each formed with at least one bleed hole of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, and indicating means so operatively connected to the diaphragm as to move proportionately to pressure-responsive movements of the diaphragm.

3. A rate-of-climb indicating instrument of the type described comprising in combination an instrument casing hermetically sealable to provide a self-contained air capacity, a fluid-pressure chamber located within the instrument casing and constituted by a dished back plate and a flexible diaphragm secured to said plate and extending over its concavity, the diaphragm being formed at its center with a single bleed hole and the back plate being formed with a plurality of bleed holes, each of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, and indicating means so operatively connected to the diaphragm as to move proportionately to pressure-responsive movements of the diaphragm.

4. A rate-of-climb indicating instrument as claimed in claim 1 in which each bleed hole is formed in a jewel of hard material having a low coefficient of expansion.

5. A rate-of-climb indicating instrument of the type described comprising in combination an instrument casing hermetically sealable to provide a self-contained air capacity, a fluid-pressure chamber located within the instrument casing and constituted by a dished back plate and a flexible diaphragm secured to said plate and extending over its concavity, the chamber being formed with a plurality of bleed holes each of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, indicating means comprising cooperating stationary and moving parts with the latter so operatively connected to the diaphragm as to move proportionately to pressure-responsive movements of the diaphragm, and a zero damping device arranged for operation by magnetic attraction between the cooperating moving and stationary parts of the indicating means.

6. A rate-of-climb indicating instrument of the type described comprising in combination an instrument casing hermetically sealable to provide a self-contained air capacity, a fluid-pressure chamber located within the instrument casing and constituted by a dished back plate and a flexible diaphragm secured to said plate and extending over its concavity, the chamber being formed with a plurality of bleed holes each of predetermined cross-sectional area and minimum length, providing restricted access between the interior of the chamber and the interior of the instrument casing, a pipe conduit extending through the instrument casing and at its inner end communicating with the interior of the fluid-pressure chamber through an aperture in the back plate and at its outer end opening to atmospheric pressure, an indicating needle so operatively connected to the diaphragm as to move proportionately to pressure-responsive movements of the diaphragm, a stationary scale graduated from a zero mark, a magnetized button placed at the zero mark and a cooperating magnetizable part carried by the needle to form a zero damping device.

7. A rate-of-climb indicating instrument of the type described comprising in combination an instrument casing hermetically sealable to provide a self-contained air capacity, a fluid-pressure chamber located within the instrument casing and constituted by a dished back plate having a diaphragm secured to it and extending across its concavity and a dished front plate attached to the back plate with the concavities of the two plates opposed to one another, an instrument movement mounted on the front plate, a push rod attached to the diaphragm, extending through an aperture in the front plate and operatively connected to the instrument movement, indicating means operable by the instrument movement to give an indication proportional to pressure-responsive movements of the diaphragm, and a pipe conduit extending through the instrument casing and at its inner end communicating with the interior of the fluid pressure chamber through an aperture in the back plate and at its outer end opening to atmospheric pressure, the fluid-pressure chamber being formed with a plurality of bleed holes each of predetermined cross-sectional area and minimum length, providing restricted access to the interior of the chamber and the interior of the instrument casing.

RALPH HARRISON ARCHBALD.